United States Patent
He et al.

(10) Patent No.: US 11,820,679 B1
(45) Date of Patent: Nov. 21, 2023

(54) ENERGY SELF-SUFFICIENT HIGH-EFFICIENCY PHOTO-THERMAL EVAPORATIVE NANO-PARTICLE POROUS MEMBRANE, PREPARATION METHOD AND APPLICATION THEREOF

(71) Applicant: Institute of Eco-environmental and Soil Sciences, Guangdong Academy of Sciences, Guangzhou (CN)

(72) Inventors: Bin He, Guangzhou (CN); Yu Ma, Guangzhou (CN)

(73) Assignee: Institute of Eco-environmental and Soil Sciences, Guangdong Academy of Sciences, Guangzhou (CN)

( * ) Notice: Subject to any disclaimer, the term of this patent is extended or adjusted under 35 U.S.C. 154(b) by 0 days.

(21) Appl. No.: 18/114,578

(22) Filed: Feb. 27, 2023

(30) Foreign Application Priority Data

Jul. 4, 2022 (CN) .......................... 202210776291.8

(51) Int. Cl.
  *B01D 71/40* (2006.01)
  *C02F 1/44* (2023.01)
  *C08J 9/28* (2006.01)

(52) U.S. Cl.
  CPC .............. *C02F 1/447* (2013.01); *B01D 71/40* (2013.01); *C08J 9/28* (2013.01); *C08J 2333/12* (2013.01); *C08J 2479/04* (2013.01)

(58) Field of Classification Search
  CPC ... C02F 1/447; B01D 71/40; C08J 9/28; C08J 2333/12; C08J 2479/04
  See application file for complete search history.

(56) References Cited

U.S. PATENT DOCUMENTS

2017/0246592 A1* 8/2017 Li .......................... B82Y 30/00

FOREIGN PATENT DOCUMENTS

| CN | 103446898 A | 12/2013 |
|----|-------------|---------|
| CN | 104558673 A | 4/2015  |
| CN | 105885077 A | 8/2016  |
| CN | 110615903 A | 12/2019 |

(Continued)

OTHER PUBLICATIONS

Zhao, F., et al., "Highly efficient solar vapour generation via hierarchically nanostructured gels", Nature Nanotechnology, vol. 13, 489-495. (Year: 2018).*

(Continued)

*Primary Examiner* — Benjamin L Lebron
(74) *Attorney, Agent, or Firm* — Kaplan Breyer Schwarz, LLP; Stuart H. Mayer

(57) ABSTRACT

Disclosed are an energy self-sufficient high-efficiency photothermal evaporative nano-particle porous membrane and application thereof, including: dissolving polymer A in solvent B to obtain solution A; dripping solution A into solvent C to obtain a polymer A nano hydrogel dispersion; evenly mixing polymer A nano hydrogel dispersion and nano particle dispersion of photothermal conversion material D to obtain a co-blended dispersion; performing suction-filtering to the co-blended dispersion on a surface of a solvent-resistant membrane E to form an A-D co-blended membrane; and performing suction-filtering to a solvent F using the A-D co-blended membrane, followed by drying to obtain a high-efficiency photothermal evaporative nano-particle porous membrane.

9 Claims, 32 Drawing Sheets

(56) References Cited

FOREIGN PATENT DOCUMENTS

| CN | 110773001 A | 2/2020 |
|---|---|---|
| CN | 110860218 A | 3/2020 |
| CN | 112128996 A | 12/2020 |
| CN | 113285070 A | 8/2021 |

OTHER PUBLICATIONS

Zou, Y., et al., "Boosting solar steam generation by photothermal enhanced polydopamine/wood composites", Polymer, 217 123464. (Year: 2021).*

Zhao, F., et al., "Materials for solar-powered water evaporation", Nature Reviews, vol. 5, 388. (Year: 2020).*

Ma, Y., et al., "Hollowing of nanoparticle membrane by sacrificing phase-inversion-formed nanohydrogel to enhance solar-steam generation efficiency", Desalination, 546, 116230. (Year: 2023).*

Wu, J., et al., "Photothermal nanocomposite membranes for direct solar membrane distillation", J. Mater. Chem. A, 5, 23712. (Year: 2017).*

* cited by examiner

US 11,820,679 B1

ENERGY SELF-SUFFICIENT HIGH-EFFICIENCY PHOTO-THERMAL EVAPORATIVE NANO-PARTICLE POROUS MEMBRANE, PREPARATION METHOD AND APPLICATION THEREOF

CROSS-REFERENCE TO RELATED APPLICATIONS

This application claims priority to Chinese Patent Application No. 202210776291.8, filed on Jul. 4, 2022, the contents of which are hereby incorporated by reference.

TECHNICAL FIELD

The present disclosure belongs to the technical field of photothermal evaporation materials for water treatment, and in particular relates to an energy self-sufficient high-efficiency photothermal evaporative nano-particle porous membrane, a preparation method and an application thereof.

BACKGROUND

Access to freshwater resources in an efficient manner is a major requirement for the sustainable utilization of water resources, and desalination works as an effective means to address water shortage. General methods of desalination include reverse osmosis, electrodialysis, multi-effect flash, and vapor compression, etc.; yet, all of the methods require considerable consumption of fossil fuels and result in greenhouse gas emissions. As a technology to collect water vapor for desalination based on the heat production of solar absorber to vaporize water, the technology of photothermal evaporation possesses great potential for application in seawater desalination.

Direct contact between photothermal conversion materials and water causes 43 percent (%) of heat conduction loss, 7% of heat radiation loss and 5% of heat convection loss; hence photothermal materials are reasonably combined to construct a highly absorbent membrane that localizes light produced heat to the evaporating surface, so as to strengthen the thermal management mechanism and effectively reduce heat loss. Based on this, a porous membrane is prepared in response to the problem that the remaining electromagnetic waves are inevitably reflected after absorbing certain energy electromagnetic waves by the photothermal conversion materials, so that the electromagnetic waves are continuously reflected and absorbed (light trapping) within the pores of the membrane composed of photothermal materials, thus maximizing the photothermal conversion capacity of the materials and increasing the chance of light absorption, and can further enhance the photothermal conversion efficiency of the membrane.

A typical method of light trapping is to use an origami process to manually fold the photothermal evaporative membrane into a specific shape at the macroscopic scale. While this process is simple and straightforward, it only changes the shape of the photothermal material at the macroscopic scale and does not involve the interaction between the material structure and electromagnetic waves at the microscopic scale, so the intrinsic properties of the photothermal evaporative membrane are not changed. In this way, photothermal evaporative membrane is changed from macroscopic planar structure to a three-dimensional structure by the origami process, thus enhancing the performance of photothermal evaporation as the three-dimensional structure membrane has a larger surface area per unit area.

In another typical method of light trapping, a vertically grown material is used instead of a horizontally deposited material, resulting in a loose structure with enough space. Previous studies found that the light absorption rate on the surface of vertically grown arrays of multi-walled carbon nano-tubes (MWCNTs) (98%) is higher than that on the surface of MWCNT deposition (0.76%). Template-assisted technology is developed by subsequent studies to simplify the manufacturing process and equipment by coating and fixing the photothermal conversion material on a nanoscale heterogeneous substrate; however, such a technology is difficult to be practically applied since the substrate of micro- and nanoscale heterogeneous structure is difficult to design and the coating process is complicated, and the stability after coating is difficult to be maintained, despite the high photothermal conversion efficiency. In addition, attempts have been made to construct apertures inside the photothermal conversion materials to achieve light trapping. Nevertheless, these apertures are mainly constructed by dry or wet chemical etching, or soft etching, which require high cost and cannot be applied to large-scale manufacture. Therefore, it is of great importance to design easy-to-use technologies to construct nano-apertures for light trapping.

SUMMARY

The primary objective of the present disclosure is to provide a method for preparing an energy self-sufficient high-efficiency photothermal evaporative nano-particle porous membrane that overcomes the shortcomings and deficiencies of the prior art.

Another objective of the present disclosure is to provide an energy self-sufficient high-efficiency photothermal evaporative nano-particle porous membrane prepared by the above method.

Another objective of the present disclosure is to provide an application of the above energy self-sufficient high-efficiency photothermal evaporative nano-particle porous membrane.

The objectives of the present disclosure are realized by the following technical schemes:

a method for preparing an energy self-sufficient high-efficiency photothermal evaporative nano-particle porous membrane, including steps as follows:

(1), dissolving polymer A in solvent B to obtain solution A; dripping solution A into solvent C to obtain a polymer A nano hydrogel dispersion;

(2), evenly mixing polymer A nano hydrogel dispersion and nano particle dispersion of photothermal conversion material D to obtain a co-blended dispersion; performing suction-filtering to the co-blended dispersion on a surface of a solvent-resistant membrane E to form an A-D co-blended membrane; and (3), performing suction-filtering to a solvent F using the A-D co-blended membrane as making the polymer A dissolved in the solvent F while the photothermal conversion material D is not dissolved, and drying to obtain the high-efficiency photothermal evaporative nano-particle porous membrane.

The polymer A in the step (1) includes at least one selected from a group of polymethyl methacrylate (PMMA), polyethersulfone, polyvinylidene fluoride, polypropylene and polyamide, where PMMA is preferred.

The PMMA is preferably PMMA with a molecular weight of 0.64 megadalton (MDa).

The solvent B in the step (1) is at least one selected from a group of tetrahydrofuran, dimethylformamide, dimethyl sulfoxide, dichloromethane and acetone, where tetrahydrofuran is preferred.

The solvent B in the step (1) is used preferably in an amount of polymer A:solvent B=0.1-1 gram (g):100 milliliters (mL).

In the step (1), dissolving polymer A in solvent B is carried out under a heating condition so as to dissolve the polymer A in solvent B; and the obtained solution A is cooled to room temperature before being dripped into the solution C if the polymer A is dissolved under heating.

The room temperature is 20-30 degree Celsius (° C.), preferably 24-27° C.

The heating preferably includes heating to a temperature range of 55° C.-65° C., more preferably 60° C.

The dripping in step (1) is preferably carried out in a dripping speed of 4-6 milliliters per minute (mL/min), more preferably 5 mL/min.

The solvent C in the step (1) is at least one of water, ethanol and acetone; preferably water.

The solvent C in the step (1) is used preferably in an amount calculated according to a concentration of 0.02-0.3 mg/mL of polymer A in the polymer A nano hydrogel dispersion.

The photothermal conversion material D in the step (2) is at least one of polypyrrole (PPy), polyaniline and poly dopamine.

The nano particle dispersion of photothermal conversion material D in the step (2) is preferably prepared as follows: dissolving polyvinylpyrrolidone and ferric chloride in water to obtain homogeneous solution; adding monomer for reaction, followed by washing, dispersing in water by ultrasonic to obtain the nano particle dispersion of photothermal conversion material D.

The ferric chloride is preferably anhydrous ferric chloride.

The ferric chloride is preferably used in a mass amount equal to more than 6 times a mass of polyvinylpyrrolidone; more preferably 6-7 times.

The water is added to fully disperse photothermal conversion material D and dissolve ferric chloride, with an amount of 150-250 times of a mass of the photothermal conversion material D, more preferably 200 times.

The monomer includes preferably at least one of pyrrole, aniline and dopamine.

The monomer is used preferably in an amount of 1/5-1/15 of a mass of anhydrous ferric chloride, and more preferably 1/8-1/9 of the mass of anhydrous ferric chloride.

The reaction is preferably carried out under stirring at 120-180 revolutions per minute (rpm) for 15-25 hours (h), more preferably at 150 rpm for 20 h.

The washing refers to solid-liquid separation by centrifugation, including washing solid with water.

The centrifugation preferably includes conditions of centrifuging at 5,000-7,000 rpm for 30-50 min, more preferably 6,000 rpm for 40 min.

The ultrasonic preferably includes conditions of ultrasonic power of 120-180 Watts (W) and ultrasonic duration of 15-30 min, more preferably ultrasonic power of 145-155 W and the ultrasonic duration of 24-27 min.

The mixing in the step (2) is preferably ultrasonic co-blending.

The ultrasonic co-blending includes conditions of ultrasonic power of 120-180 W and ultrasonic duration of 15-30 min; more preferably, the ultrasonic power is 145-155 W and the ultrasonic duration is 24-27 min; and the water mentioned herein is preferably deionized water.

The nano particle dispersion of photothermal conversion material D in the step (2) is preferably in a concentration of 30 milliliters per liter (mg/L).

The polymer A nano hydrogel dispersion and the nano particle dispersion of photothermal conversion material D in step (2) are used in an amount proportioned according to a mass ratio of polymer A: photothermal conversion material D=16-240:3.

The solvent-resistant membrane E in the step (2) is nylon microfiltration membrane, polyvinylidene fluoride microfiltration membrane or polytetrafluoroethylene microfiltration membrane; a commercial nylon microfiltration membrane (GVS North America Sanford Company, model ME04073-USA, pore size 0.1 micoremeter (μm)) is preferred.

The solvent-resistant membrane E of microfiltration membrane is preferably a commercial solvent-resistant microfiltration membrane, a commercially available membrane.

The co-blended dispersion in the step (2) for suction-filtering is in a volume of 9-30 mL; preferably, the solvent-resistant membrane E of microfiltration membrane has a diameter of 1-2 centimeters (cm), more preferably 1 cm.

The suction-filtering in the step (2) includes vacuum suction-filtering; preferably, suction-filtering is performed at 0.8 bar.

The solvent F in the step (3) is preferably at least one selected from a group of tetrahydrofuran, dimethylformamide, dimethyl sulfoxide, dichloromethane and acetone, where tetrahydrofuran is preferred.

The solvent F in the step (3) is preferably used in an amount of 10-20 mL, and more preferably 15 mL.

The suction-filtering in the step (3) includes vacuum suction-filtering; preferably, suction-filtering is performed at 0.1 bar.

The drying in the step (3) is preferably carried out at 55-65° C., more preferably at 60° C.

The drying in the step (3) is preferably carried out in a blast oven.

An energy self-sufficient high-efficiency photothermal evaporative nano-particle porous membrane is prepared with the method above.

The energy self-sufficient high-efficiency photothermal evaporative nano-particle porous membrane achieves a photothermal conversion efficiency of 64.08-93.79 percent (%), with a photothermal evaporation capacity of 0.96-1.41 kilograms per hour per square meters ($kg \cdot m^{-2} \cdot h^{-1}$).

An application of the energy self-sufficient high-efficiency photothermal evaporative nano-particle porous membrane in seawater desalination.

The seawater has components as follows: $K^+$365±1 mg/L, $Na^+$514±2 mg/L, $Ca^{2+}$228±1 mg/L, and $Mg^{2+}$227±2 mg/L.

Compared with the prior art, the present disclosure has the following advantages and effects:

firstly, the present disclosure uses amorphous polymers as the base material to prepare dilute solutions of polymers for phase transformation, thereby forming nano hydrogels in polymer non-solvents, and the process of preparation is extremely simple and highly operable; and secondly it is the first time that nano hydrogel and photothermal conversion nano particles are co-blended and then filtered into a membrane, and the subsequent solvent is used to further dissolve the nano hydrogel in the membrane to form a highly efficient photothermal conversion porous membrane, which enhances the photothermal conversion performance of the membrane, with an efficient, simple, controllable and universal preparation process.

BRIEF DESCRIPTION OF THE DRAWINGS

FIG. 2a shows a particle size distribution of nano hydrogel formed after phase transformation of different polymethyl methacrylate (PMMA) concentrations, with illustration in FIG. 2a showing a photograph of nano hydrogel dispersion producing Tindal effect; FIG. 2b shows testing results of Atomic Force Microscope (AFM) in Quantitative Nanomechanical Mapping (QNM) mode of PPy-PMMA co-blended membrane with a scale of 1 micrometer (μm); FIG. 2c shows a scanning electron microscope (SEM) image of PPy-PMMA co-blended membrane after drying with a scale of 2 μm; and FIG. 2d shows a SEM image of PPy nano-particle porous membrane, while illustrations in FIG. 2c and FIG. 2d are photos of the membrane under natural light with a scale of 2 μm.

FIG. 3a-FIG. 3d illustrate surfaces of PPy nano-particle porous membranes obtained in Embodiments 2, 3, 4, and 5, respectively, and FIG. 3e-FIG. 3h show corresponding membrane sections with a scale of 1 μm.

FIG. 7a shows the surface temperature of the membranes of Embodiment 1 (left) and Comparative embodiment 1 (right) under one solar intensity in a dry state; FIG. 7b shows the surface temperature of the membranes of Comparative embodiment 1 (left) and Embodiment 6 (right) in a wet state; and FIG. 7c shows the surface temperature of the membranes of Embodiment 1 (left) and Embodiment 2 (right) in a wet state.

FIG. 8a is a Transmission Electron Microscope (TEM) diagram (left) and element mapping diagram (right) of PPy nano-particles, where a large amount of oxygen elements with light grey to white particles is observed, particularly concentrated in a central area; FIG. 8b shows X-ray photoelectron spectroscopy (XPS) broad spectrum of PPy nano-particles (PPy NPs), conventional PPy (PPy) and PMMA nano hydrogels (PMMA NHs); FIG. 8c shows a dynamic contact angle of the membrane in Embodiment 1 (left) and the dynamic contact angle of the membrane in Comparative embodiment 1 (right).

FIG. 9a illustrates the PPy nano-particle porous membranes obtained in Comparative embodiment 1 and Embodiments 2-5 in terms of photothermal conversion efficiency and photothermal evaporation under one solar intensity, FIG. 9b shows the photothermal conversion efficiency and photothermal evaporation under one solar intensity of Comparative embodiment 1, Embodiment 1, Embodiment 6 and Embodiment 7, and FIG. 9c shows a schematic diagram of salt removal from seawater in Embodiment 1 under one solar intensity.

DETAILED DESCRIPTION OF THE EMBODIMENTS

The present disclosure is described in further detail below in conjunction with the embodiments and accompanying drawings, but the embodiments of the invention are not limited thereto.

The following embodiments adopt commercial nylon microfiltration membrane purchased from GVS North America Sanford Company, with a model number of ME04073-USA, and a pore size of 0.1 micrometer (μm).

Embodiment 1

Figure 1:
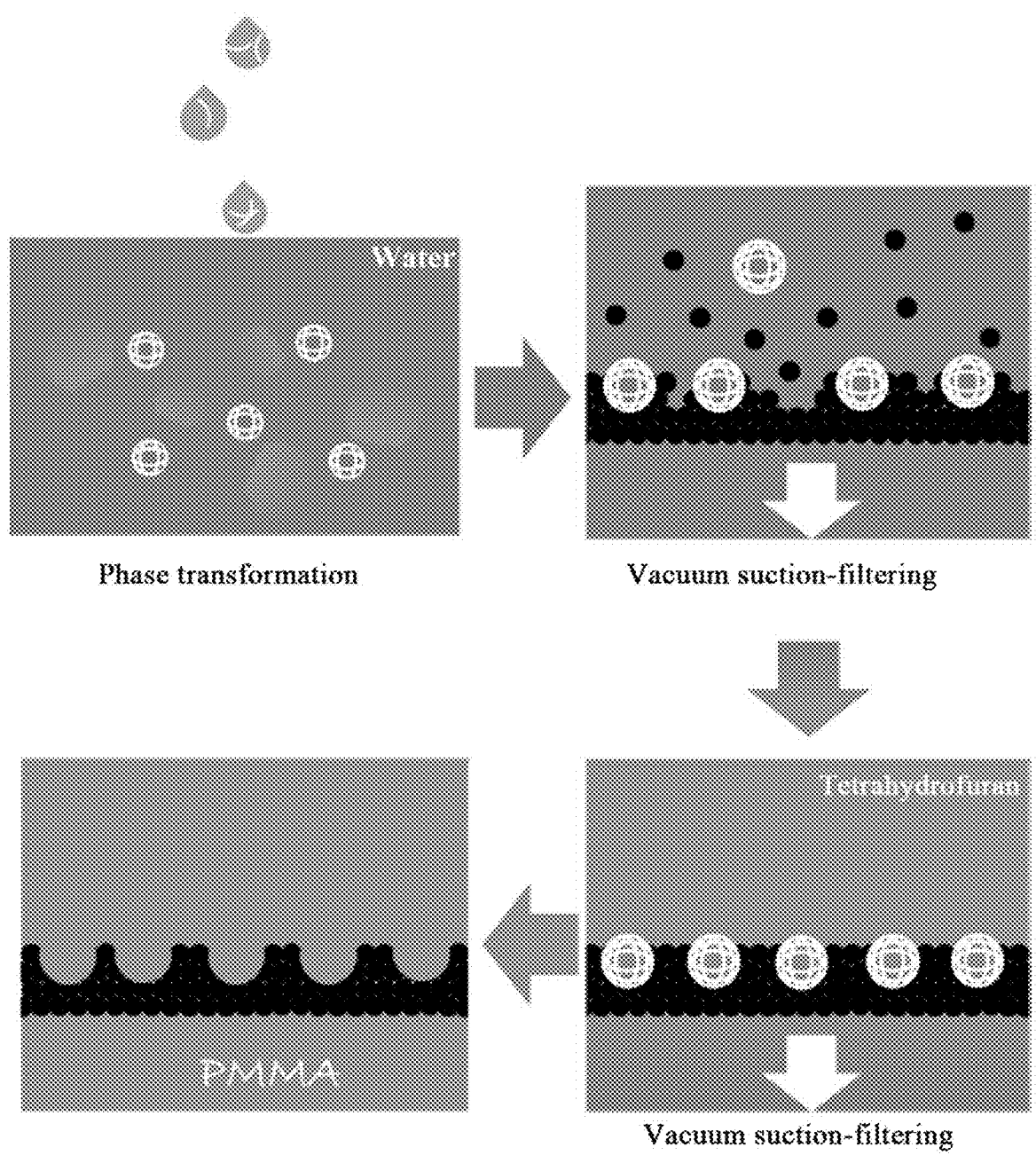
FIG. 1 shows a process of preparing polypyrrole (PPy) nano-particle porous membrane in the present disclosure.

Preparation of polypyrrole (PPy) nano-particle porous membrane, as shown in FIG. 1, the preparation includes steps as follows:

(1) synthesis of polypyrrole nano-particles 1.0 gram (g) of polyvinylpyrrolidone (PVP-K30, molecular weight range of 44,000-54,000 dalton (Da)) and 6.24 g of anhydrous ferric chloride are dissolved in 200 milliliters (mL) of deionized water to form a homogeneous solution by stirring at 25 degree Celsius (° C.), followed by adding with 0.7 mL pyrrole monomer and stirring for reaction of 20 hours (h) with a stirring speed of 150 revolutions per minute (rpm); after the reaction, solid-liquid separation is carried out by high-speed centrifugation at 6,000 rpm for 40 minutes (min), and the obtained solid is washed with deionized water, where centrifugation with subsequent washing is carried out for 3 times in total; after that, the nano-particles are dispersed in deionized water by ultrasonication at power of 150 watts (W) and duration of 25 min to obtain a polypyrrole (PPy) nano-particle dispersion at a concentration of 30 milligrams per liter (mg·L$^{-1}$);

(2) synthesis of polymethyl methacrylate (PMMA) nano hydrogel 0.6 g PMMA with molecular weight of 0.64 megadalton (MDa) is dissolved in 100 mL tetrahydrofuran (THF) at 60° C. to prepare PMMA solution, followed by cooling to 25° C., then 5 mL of PMMA solution is dripped into 200 mL of water at a dripping rate of 5 mL/min to obtain PMMA nano hydrogel dispersion;

(3) preparation of polypyrrole nano-particle porous membrane 25 mL of PPy nano-particle dispersion with the concentration of 30 mg·L$^{-1}$ and 205 mL if the PMMA nano hydrogel dispersion of step (2) are ultrasonically co-blended at 150 W for 25 min to obtain nano hydrogel-particle co-blended solution, followed by suction-filtering by a commercial nylon membrane with a diameter of 1.5 centimeters (cm) under pressure of 0.8 bar to obtain the PPy-PMMA co-blended membrane, where the filtration volume is 15 mL; finally, 15 mL of tetrahydrofuran is extracted at 0.1 bar using PPy-PMMA co-blended membrane, and the membrane is taken out after the suction-filtering to subject to drying in a blast oven at 60° C. for 2 h to obtain PPy nano-particle porous membrane.

Embodiment 2

The present embodiment follows a preparation process basically same as that of Embodiment 1, except that in step (2), the PMMA is in a mass of 0.1 g, 4 mL of PMMA solution is dripped into 200 mL of water, and the volume of suction-filtering in step (3) is 75 mL.

Embodiment 3

The present embodiment follows a preparation process basically same as that of Embodiment 1, except that in step (2), the mass of PMMA is 0.3 g, and 4 mL of PMMA solution is dripped into 200 mL of water; the volume of suction-filtering in step (3) is 30 mL.

Embodiment 4

The preparation process of the present embodiment is basically the same as that of Embodiment 1, except that in the step (2), 4 mL of PMMA solution is dripped into 200 mL of water.

Embodiment 5

The preparation process of the present embodiment is basically the same as that of Embodiment 1, except that: in the step (2), the mass of PMMA is 1.0 g, and 4 mL of PMMA solution is dripped into 200 mL of water; the volume of suction-filtering in the step (3) is 9 mL.

Embodiment 6

The preparation process of the present embodiment is basically the same as that of Embodiment 1, except that in the step (2), 8 mL of PMMA solution is dripped into 200 mL of water.

Embodiment 7

The preparation process of the present embodiment is basically the same as that of Embodiment 1, except that in the step (2), 10 mL of PMMA solution is dripped into 200 mL of water.

Comparative Embodiment 1

The polypyrrole nano-particle membrane is prepared by the following steps:

(1) synthesis of PPy nano-particles 1.0 g of polyvinylpyrrolidone (PVP-K30, molecular weight range of 44,000-54,000 Da) and 6.24 g of anhydrous ferric chloride are dissolved in 200 mL of deionized water to form a homogeneous solution by stirring at 25° C., followed by adding with 0.7 mL pyrrole monomer and stirring for reaction of 20 h with a stirring speed of 150 rpm; after the reaction, solid-liquid separation is carried out by high-speed centrifugation at 6,000 rpm for 40 min, and the obtained solid is washed with deionized water, where centrifugation with subsequent washing is carried out for 3 times in total; after that, the nano-particles are dispersed in deionized water by ultrasonication at power of 150 W and duration of 25 min to obtain a PPy nano-particle dispersion at a concentration of 30 mg·L$^{-1}$;

(2) preparation of polypyrrole nano-particle membrane 25 mL of PPy nano-particle dispersion with the concentration of 30 mg·L$^{-1}$ is diluted to 200 mL, and the dispersion with a volume of 15 mL is subjected to suction-filtering by a commercial nylon membrane with a filtering area of 1.77 square centimeters (cm$^2$) under pressure of 0.8 bar, then the membrane is taken off and dried in a blast oven at 60° C. for 2 h to obtain PPy nano-particle membrane.

Comparative Embodiment 2 preparation of traditional PPy:

6.24 g anhydrous ferric chloride is dissolved in 200 mL deionized water and stirred at 25° C. to form a homogeneous solution, followed by adding with 0.7 mL pyrrole monomer and stirring for reaction of 20 h with a stirring speed of 150 rpm; after the reaction, suction-filtering is carried out at 0.8 bar with three times of washing with deionized water; after washing, traditional PPy is obtained by drying in a blast oven at 60° C.

Effect Embodiment

The parameters of Embodiments 1-7 and Comparison embodiment 1, the photothermal conversion and photothermal evaporation of the membranes are shown in Table 1.

TABLE 1

Preparation parameters and properties of membranes

| Membrane | Nano hydrogel preparation parameters | | Membrane preparation parameters | Membrane permeability | |
|---|---|---|---|---|---|
| | Mass of polymethyl methacrylate (g) | Phase transformation volume of solution (mL) | Suction-filtering volume (mL) | Photothermal conversion efficiency (%) | Photothermal evaporation rate (kg · m$^{-2}$ · h$^{-1}$) |
| Embodiment 1 | 0.6 | 5 | 15 | 93.79 ± 0.89 | 1.42 ± 0.01 |
| Embodiment 2 | 0.1 | 4 | 75 | 88.56 ± 1.66 | 1.33 ± 0.02 |
| Embodiment 3 | 0.3 | 4 | 30 | 88.74 ± 2.45 | 1.33 ± 0.04 |
| Embodiment 4 | 0.6 | 4 | 15 | 92.39 ± 1.11 | 1.39 ± 0.02 |
| Embodiment 5 | 1.0 | 4 | 9 | 75.30 ± 8.89 | 1.13 ± 0.13 |
| Embodiment 6 | 0.6 | 8 | 15 | 64.08 ± 9.78 | 0.96 ± 0.14 |
| Embodiment 7 | 0.6 | 10 | 15 | 73.13 ± 6.22 | 1.11 ± 0.09 |
| Comparison embodiment 1 | — | — | 15 | 76.94 ± 0.44 | 1.15 ± 0.01 |
| Comparison embodiment 2 | — | — | — | — | — |

FIG. 1 is a schematic diagram of the process of preparing PPy nano-particle porous membrane in the present disclosure, in which the preparation of PMMA nano hydrogel is realized by phase transformation technique, and the PPy nano-particle nano hydrogel is prepared by dissolving the nano hydrogel inside the membrane after co-blending with PPy nano-particles and extracting them into the membrane.

Figure 2A:
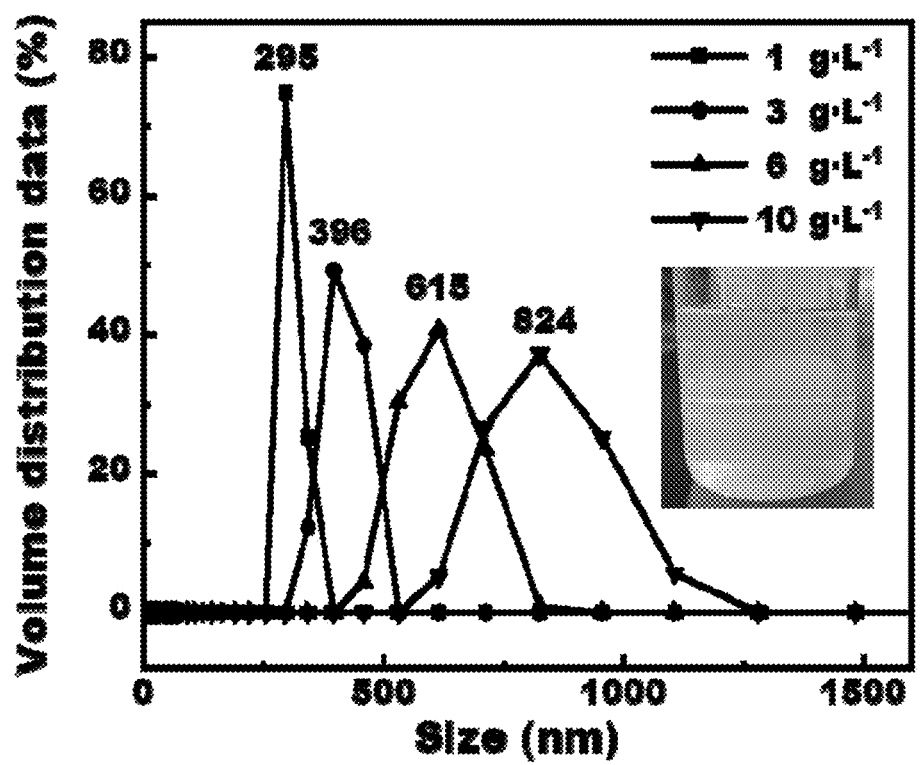
FIGS. 2a, 2b, 2c and 2d show characterizations of the process of preparing PPy nano-particle porous membrane in the present disclosure, where
Figure 2B:
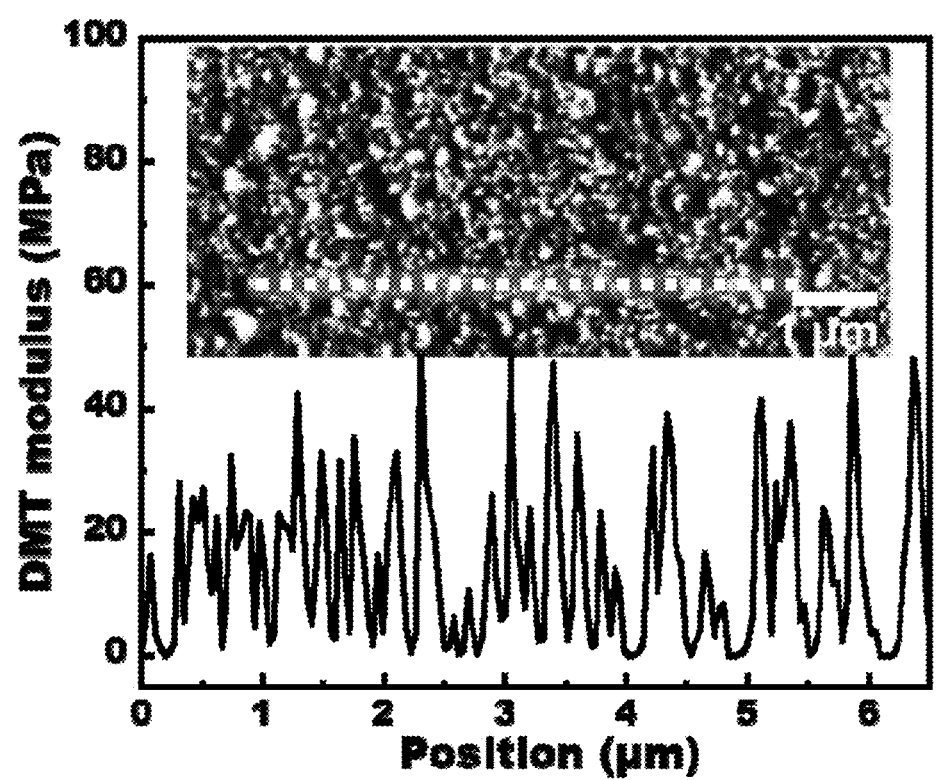
Figure 2C:
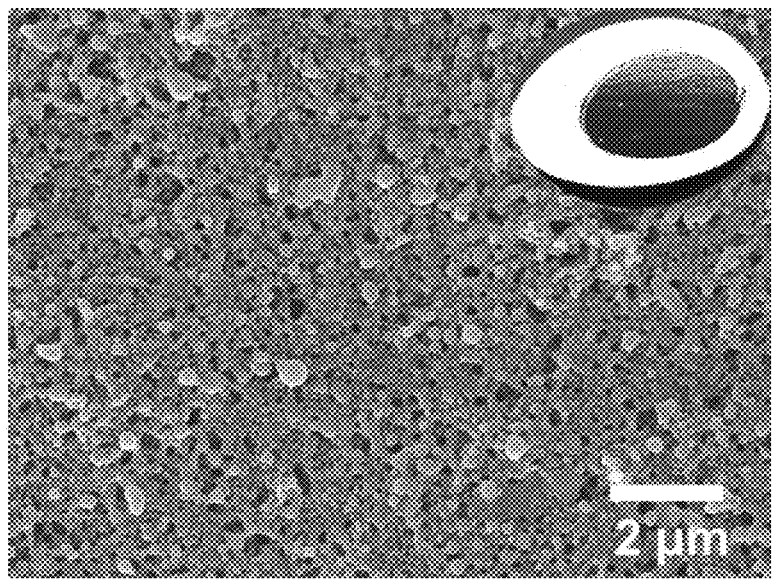
Figure 2D:
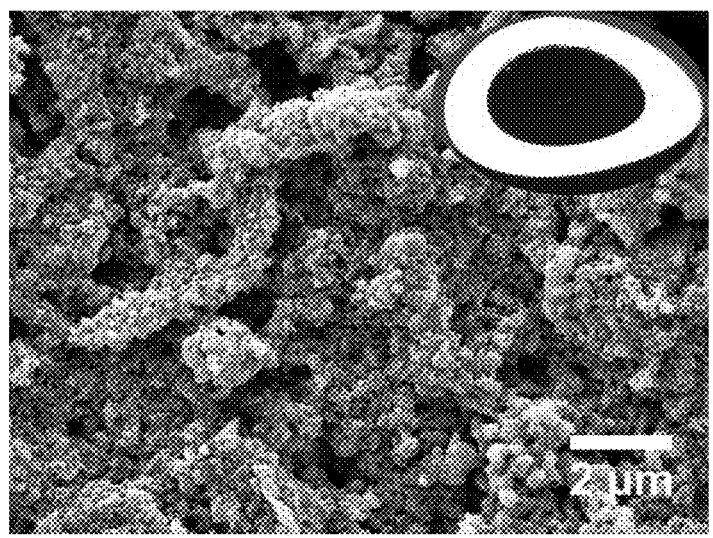
Figure 3A:
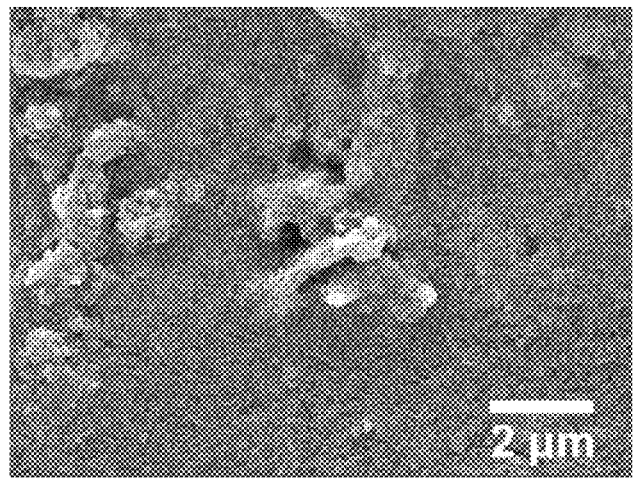
FIGS. 3a, 3b, 3c, 3d, 3e, 3f, 3g, and 3h—show the SEM images of PPy nano-particle porous membranes obtained in Embodiments 2-5; where
Figure 3B:
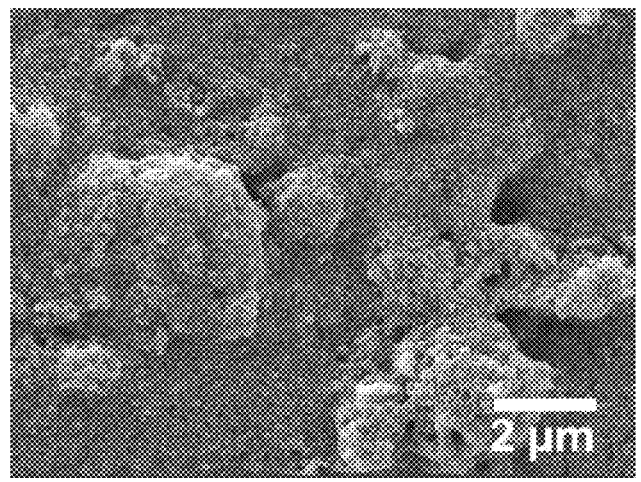
Figure 3C:
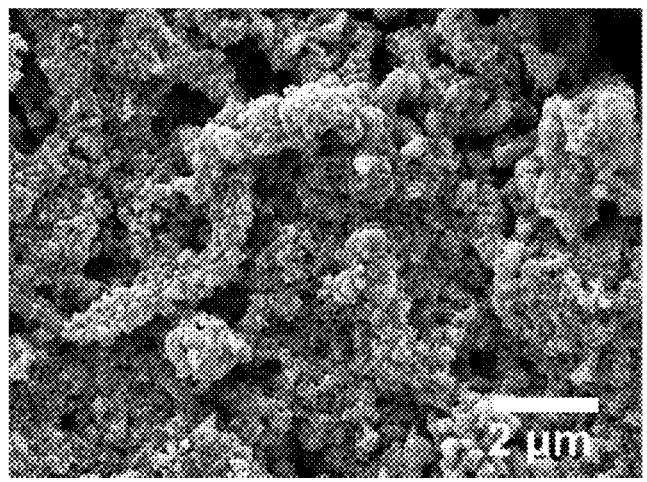
Figure 3D:
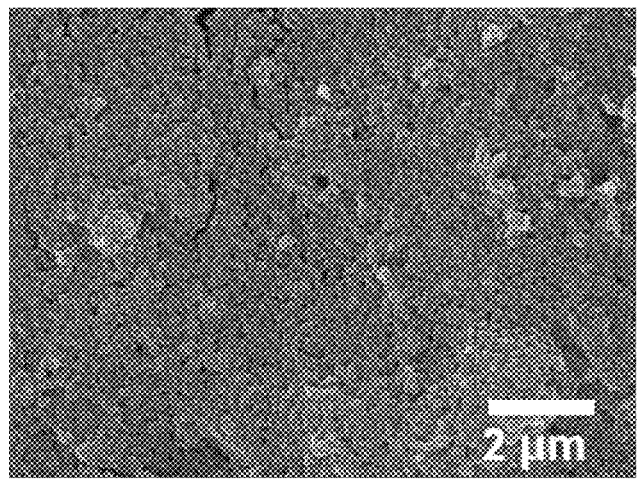
Figure 3E:
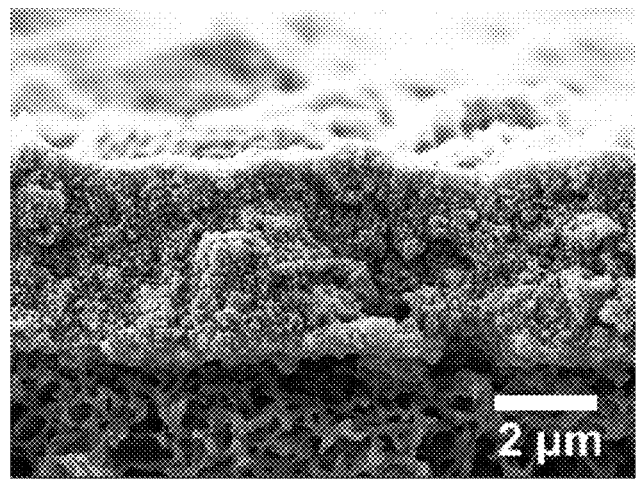
Figure 3F:
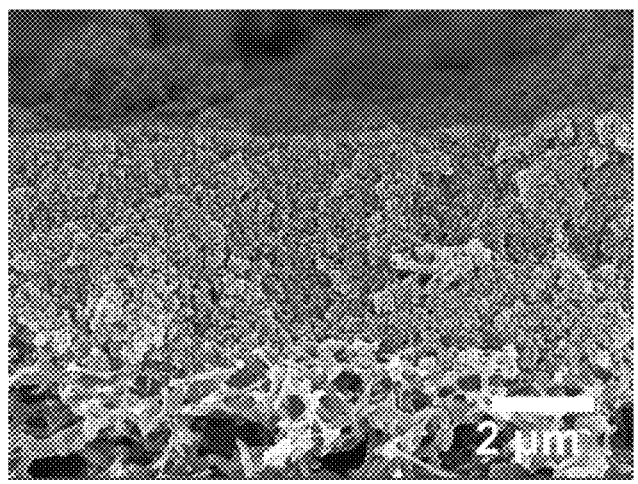
Figure 3G:
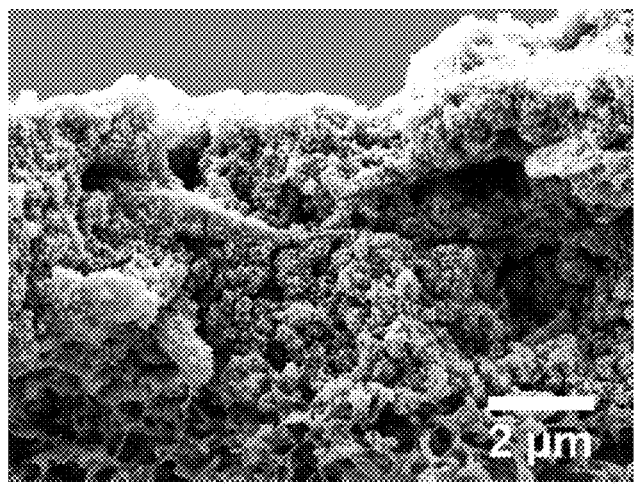
Figure 3H:
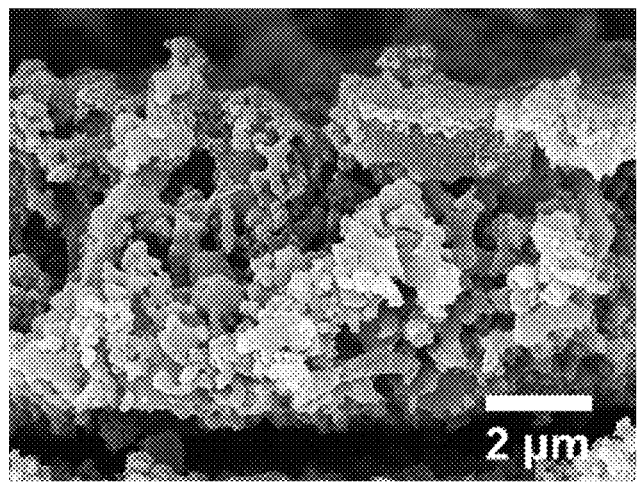
Figure 4A:
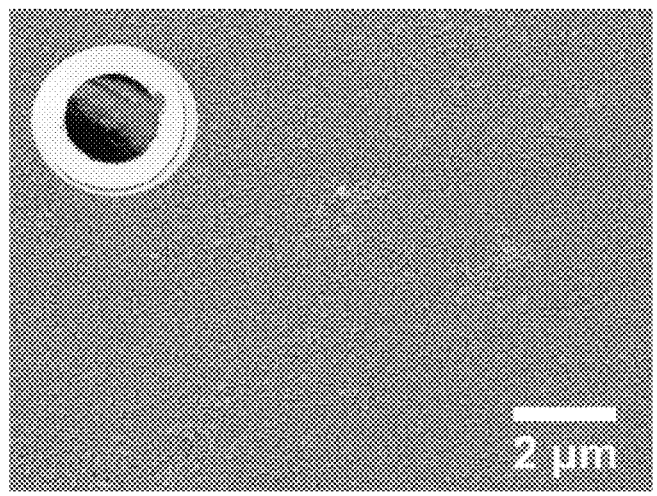
FIGS. 4a, 4b, 4c and 4d are photomicrographs of the PPy nano-particle porous membrane surface obtained respectively in Comparative embodiment 1, Embodiment 1, Embodiment 6, and Embodiment 7, with a scale of 2 μm, and the illustration is a photograph of the membrane under illumination of one solar intensity (1 kilowatt per square meters (kW·m$^{-2}$)).
Figure 4B:
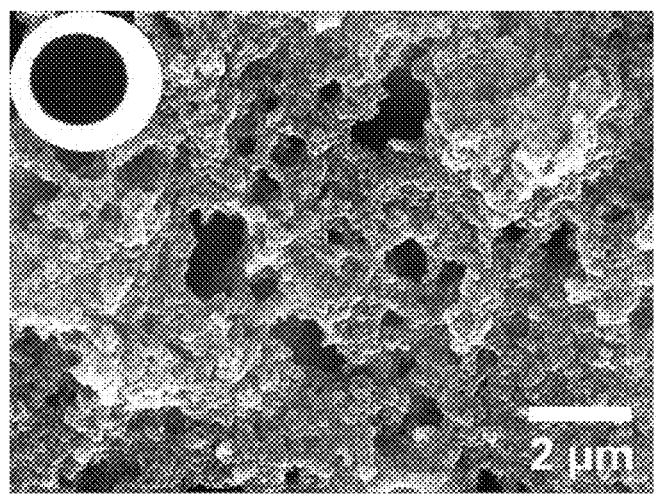
Figure 4C:
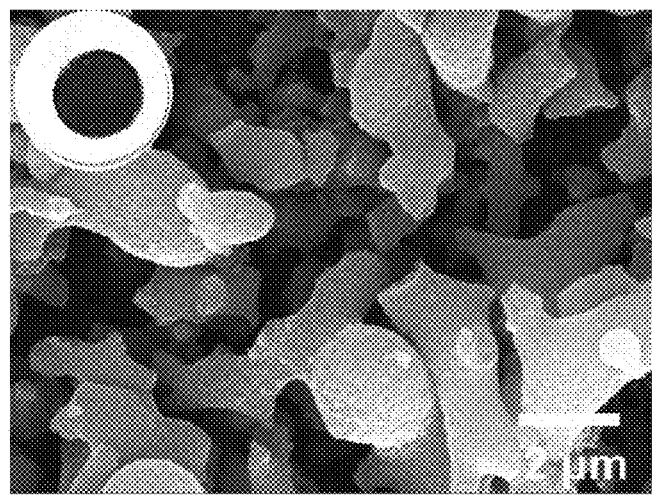
Figure 4D:
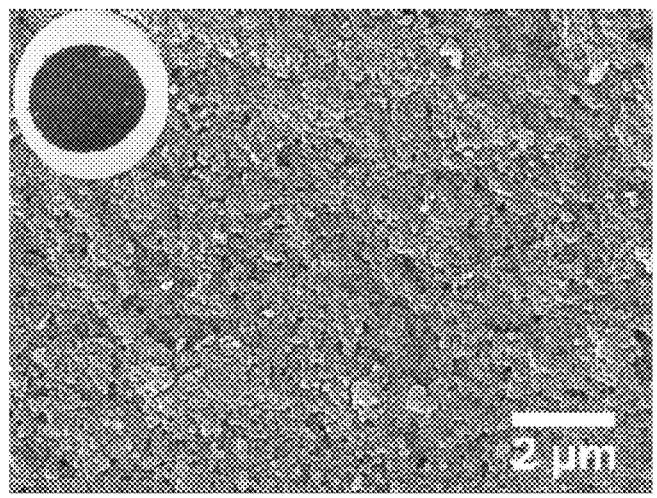

FIG. 2a-FIG. 2d show characterizations of the process of preparing PPy nano-particle porous membrane, where the illustration in FIG. 2a shows a photograph of nano hydrogel dispersion producing Tindal effect, which proves that PMMA phase transformation forms nano-scale and uniformly dispersed particles (optical photos). FIG. 2a illustrates that the concentration of PMMA involved in the phase transformation in step 2 of Embodiments 1-7 has a significant effect on the size of the final formed nano hydrogel (tested by a nano-particle tracking analyzer, model: NanoSight NS300), and it can be seen that the size of the formed nano hydrogel gradually becomes larger and the size distribution gradually becomes wider as the PMMA concentration increases. This is mainly due to the fact that the increase in polymer concentration leads to a phase transition procedure toward the continuous formation of large-area porous structures, which is increasingly unfavorable for the formation of relatively independent nano hydrogels. As shown in FIG. 2b, after assembling PPy nano-particles and PMMA nano hydrogels into a co-blended membrane, the surface modulus distribution of the membrane obtained by the Quantitative Nanomechanical Mapping (QNM) mode of Atomic Force Microscope (AFM) appears to be severely inhomogeneous (tested by Peakforce-QNM (PF-QNM) mode of AFM, model: Bruker Dimension Icon).

In the main region of the membrane surface, the Derjaguin-Muller-Toporov (DMT) modulus is about 27-40 MPa, whereas a large number of discontinuous regions with a modulus of 1-3 megapascal (MPa) exist in the main region; these areas with low modulus should be PMMA nano hydrogels, which are amorphous polymers whose phase transition process is mainly through hydrogen bonding or dipole gelation, and cannot be cured and remain in a gel state if being dispersed in water, hence the low modulus. In addition, the surface morphology of the membrane is characterized by scanning electron microscopy (SEM) (model: TESCAN MIRA4) after the PPy-PMMA co-blended membrane is dried (FIG. 2c), and it is found that a porous structure appears on the surface of the membrane, which is not the same as the characterization result of AFM; the reason for this appearance is that the PMMA nano hydrogel gradually loses water during the drying process and polymer agglomerates are formed on the membrane surface. Further characterization reveals that PPy porous membrane formed after removing PMMA nano hydrogel in the membrane in a wet state without drying the co-blended membrane exhibits a very different porous structure from that of the co-blended membrane (FIG. 2d), this structure is clearly observable at the microscopic scale of nano-particles, and the PPy nano-particle porous membrane does not reflect under natural light, while the co-blended membrane does. The above results indicate that PMMA nano hydrogels and PPy nano-particle porous membranes are successfully synthesized by the present disclosure through the low concentration phase transformation process.

The results of SEM (model: TESCAN MIRA4) as shown in FIG. 3a-FIG. 3h indicate that the porous membranes with rough structures are obtained in Embodiments 2-4, and the pores in the porous membranes obtained in Embodiments 2-3 appear aggregated, and the number of pores is significantly smaller compared to that in Embodiment 4. The surface of the membrane obtained in Embodiment 5 shows no obvious rough porous structure, while many fragmented PPy nano-particle aggregates appear in its interior. Therefore, the influence of the concentration of PMMA solution on the membrane structure is very significant.

The microscopic morphology of the membrane surface is observed by SEM (model: TESCAN MIRA4), and the results as illustrated in FIG. 4a-FIG. 4d (where the illustrations in FIG. 4a, FIG. 4b, FIG. 4c, and FIG. 4d are optical photos) shows that the surface morphologies of the PPy nano-particles porous membranes obtained from Comparative embodiment 1, Embodiment 1, Embodiment 6, and Embodiment 7 are significantly different. The surface of PPy nano-particle membrane with no PMMA nano hydrogel treatment is homogeneous, while the increased volume of phase conversion solution in Embodiment 1 can significantly promote the formation of porous structure on the membrane surface. When the volume of the phase conversion solution is further increased (Embodiment 6), it is observed that the membrane surface shows fragmented PPy nano-particle aggregates and no continuous structure is formed. Furthermore, by increasing the volume of the phase conversion solution based on Embodiment 6 (Embodiment 7), it is observed that the membrane surface forms a more uniform and continuous structure. Therefore, it is suggested that the volume of the phase conversion solution also has a significant effect on the membrane structure.

Figure 5A:
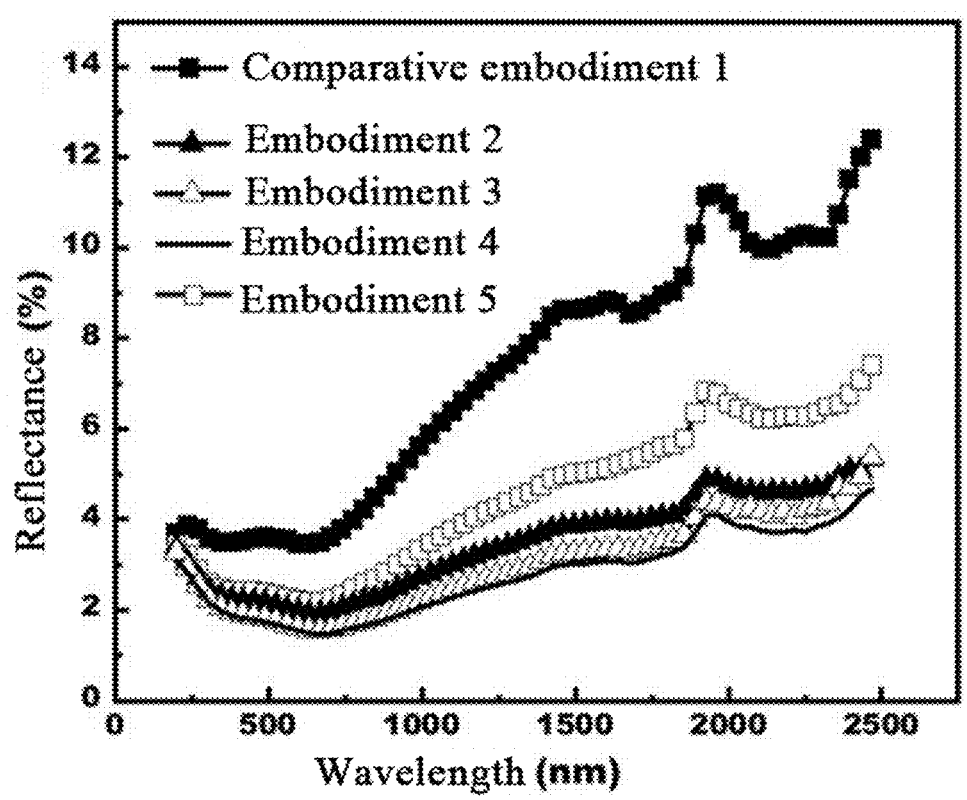
FIGS. 5a, 5b, and 5c present graphs showing detection results of reflectance, transmittance and absorbance of PPy nano-particle porous membranes obtained in Comparative embodiment 1 and Embodiments 2-5.
Figure 5B:
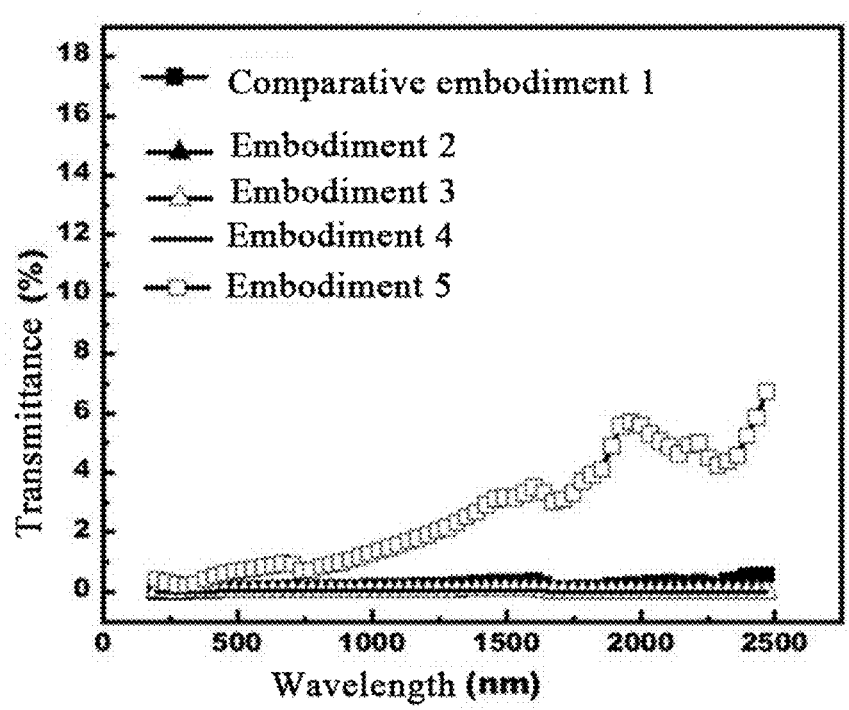
Figure 5C:
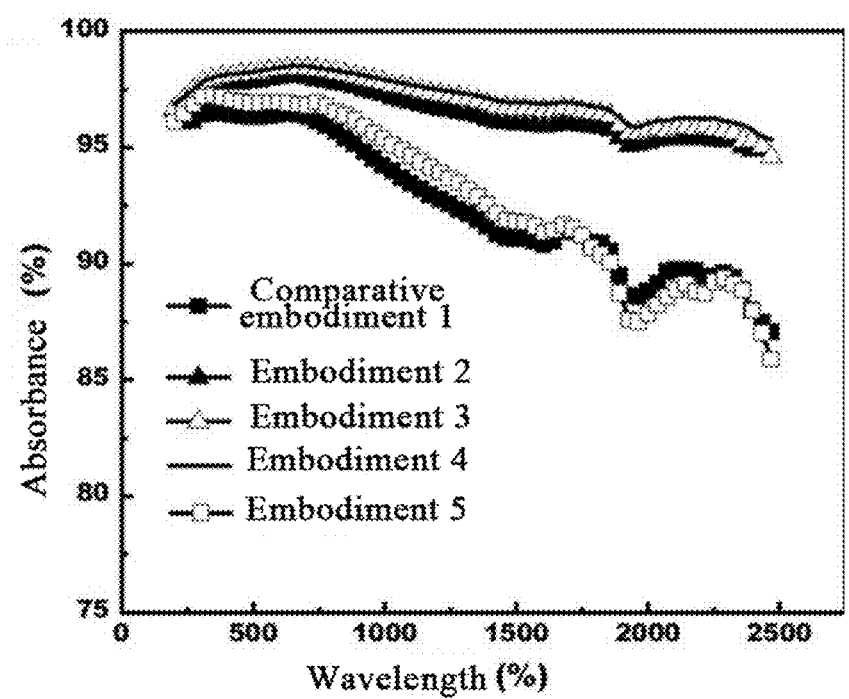

FIG. 5a and FIG. 5b are measured by UV-Vis-IR spectrometer (model: Agilent Cary 5000), and the absorbance data in FIG. 5c is obtained by the formula: A=100% —reflectivity (R)—transmittance (T). as shown in FIG. 5a-FIG. 5c, the light reflectance of the membranes obtained in Embodiments 2-5 is significantly reduced compared with that of Comparative embodiment 1, suggesting that the rough porous structure formed by the PPy nano-particle membranes treated with PMMA nano hydrogel can effectively reduce the light reflectance of the membranes, and a large amount of light waves travel in the porous structure inside the membranes. In addition, the light transmittance of the membranes obtained in Embodiments 2-4 is approximately the same as that of Comparative embodiment 1, while the light transmittance of the membranes obtained in Embodiment 5 is significantly higher than that of Comparative embodiment 1. In conclusion, the absorption rates of the membranes obtained in Embodiments 2-4 are significantly higher than those in Comparative embodiment 1 and Embodiment 5 and the above results indicate that the appearance of pore structures in the membranes significantly reduces the light reflectance of the membranes, but the change of the pore structures to fragmented nano-particle aggregates (FIG. 3h) leads to easy light penetration through the membranes, which also causes a decrease in light absorption capacity.

Figure 6A:
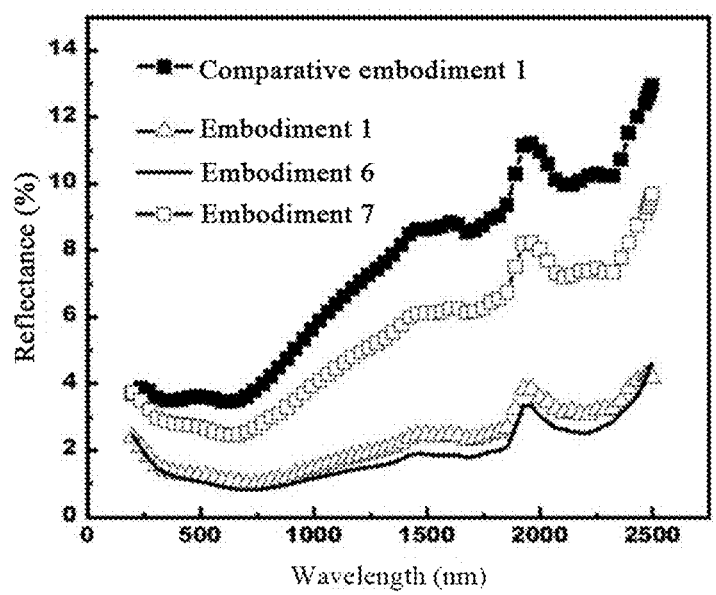
FIGS. 6a, 6b, and 6c illustrate graphs showing measurement results of reflectance, transmittance and absorbance of PPy nano-particle porous membranes obtained by Comparative embodiment 1, Embodiment 1, Embodiment 6 and Embodiment 7.
Figure 6B:
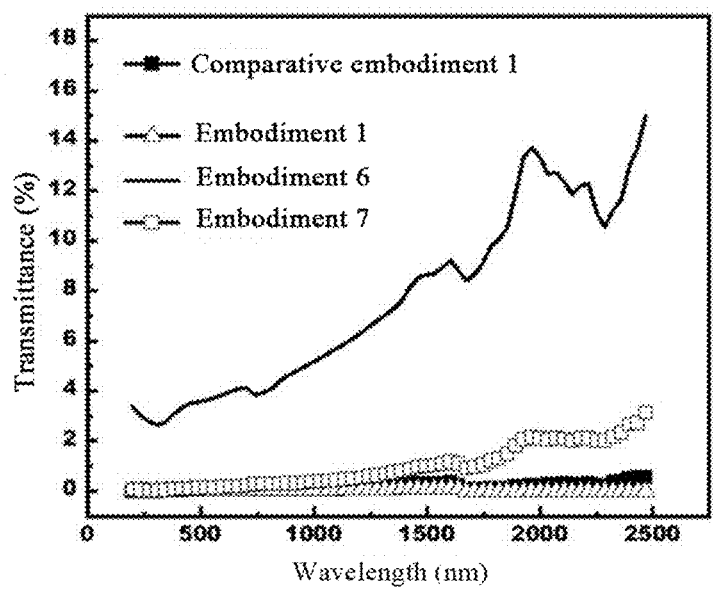
Figure 6C:
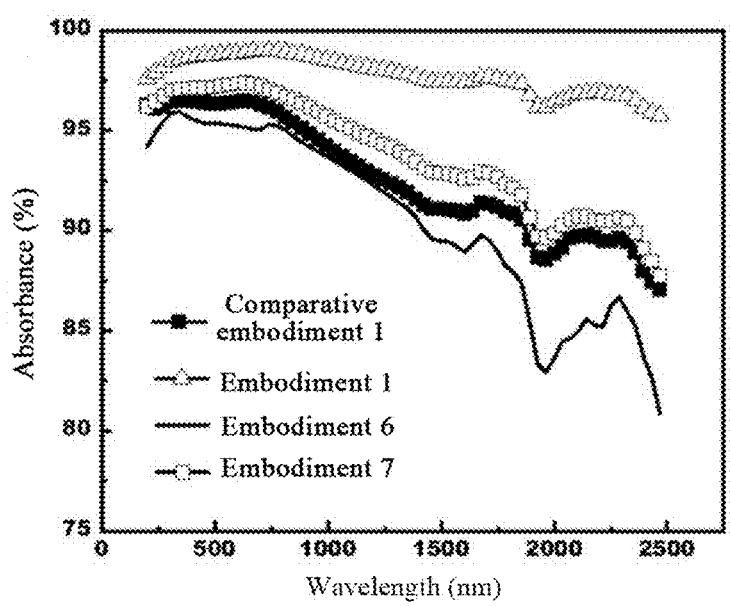

FIG. 6a and FIG. 6b are obtained with a UV-Vis-IR spectrometer (model: Agilent Cary 5000), and the absorbance data in FIG. 6c is obtained by the formula: A=100%—reflectivity (R)—transmittance (T), where FIG. 6a-FIG. 6c reflect roughly the same problem as the results shown in FIG. 5a-FIG. 5c. The lowest light transmittance and the highest light absorption of all the embodiments are found in Embodiment 1; based on the Embodiment 1, however, the light reflection rate reaches the lowest while the light transmittance increases significantly after the volume of phase conversion solution is increased again to form fragmented nano-particle aggregates (Embodiment 6), which finally makes the PPy nano-particle porous membrane obtained in Embodiment 6 the sample with the lowest light absorption rate among all the embodiments. From the above results, it is clear that reasonable control of PMMA solution concentration and volume of phase conversion solution are crucial to obtain the PPy nano-particle porous membrane with the best absorbance. The internal porous structure can effectively improve the absorbance of the membrane, but the absorbance of the membrane will inevitably decrease significantly after the fragmentation of the porous structure.

Figure 7A:
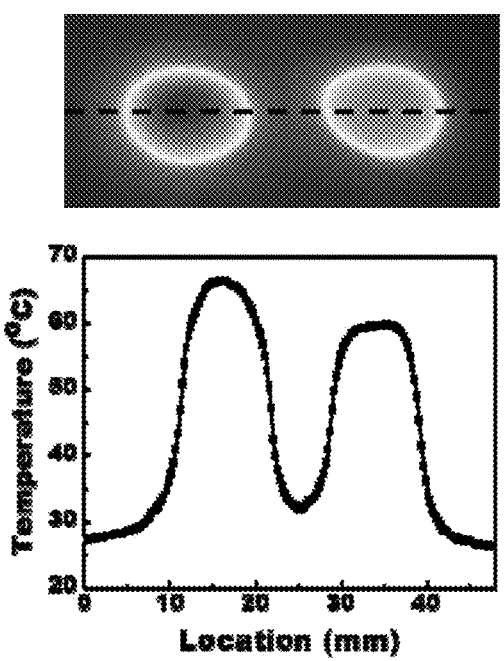
FIGS. 7a, 7b and 7c show the membranes of embodiments and comparative embodiments in terms of surface temperature, where the upper part of a, b, and c are the surface temperature of the membranes photographed by infrared thermography, and the lower part is the temperature change curve of the membranes at different locations according to the white dashed line.
Figure 7B:
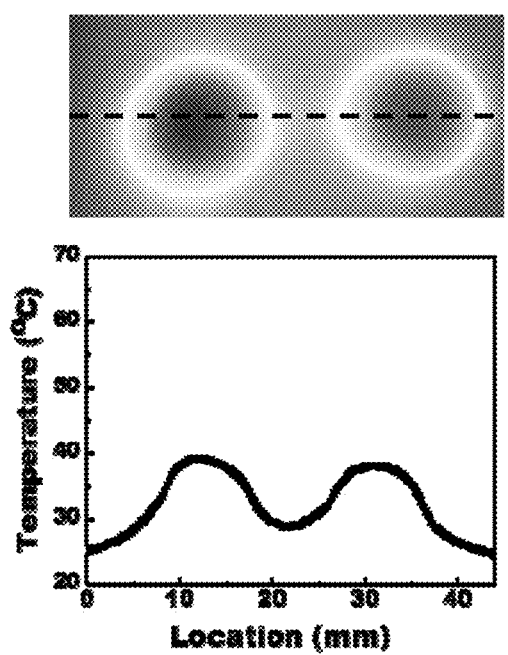
Figure 7C:
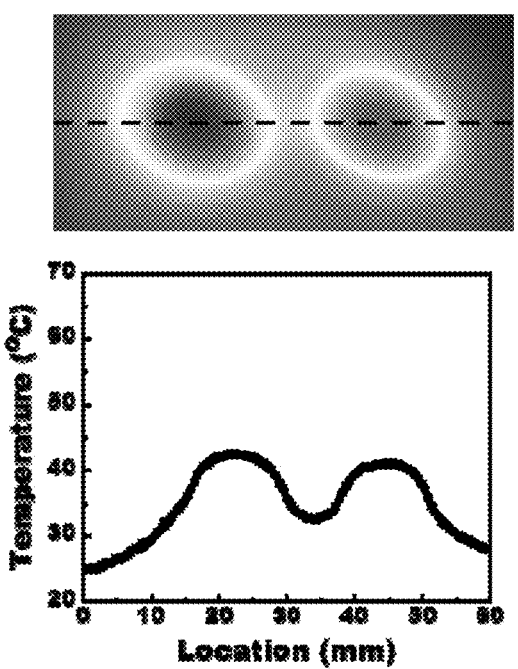

All characterization results in FIG. 7a-FIG. 7c are obtained using a thermal imager (model: Fluke TiS65) test; the surface temperature of the membrane in Comparative embodiment 1, Embodiment 1 in the dry state at one solar intensity is characterized as shown in FIG. 7a, and it is observed that the temperature magnitude of the membrane is positively correlated with the light absorption capacity of the membrane, with the surface temperature of the membrane in Embodiment 1 reaching up to 66.4° C., which is 6.7° C. higher than the maximum surface temperature of the membrane in Comparative embodiment 1, while the surface temperature of the membranes all experience a substantial decrease in the wet state; FIG. 7b shows the surface temperature of the membranes in Comparative embodiment 1 and Embodiment 6, and it is found that the surface temperature of the membranes in Comparative embodiment 1 is 39.1° C., 20.6° C. lower than the temperature in the dry state; it is supposed that the water has a low average temperature (25-27° C.) and a high specific heat capacity, which causes the heat in the membrane to be transferred to the water. Also, the lowest membrane surface temperature of 38° C. is found in Embodiment 6, and the surface temperature of the membrane in Embodiment 2 is 1.6° C. lower than that in Embodiment 1 (FIG. 7c, the surface temperature of the membrane in Embodiment 1 is 42.4° C.), suggesting that the change in membrane surface temperature under wet state is still positively correlated with the light absorption capacity of the membrane.

Figure 8A:
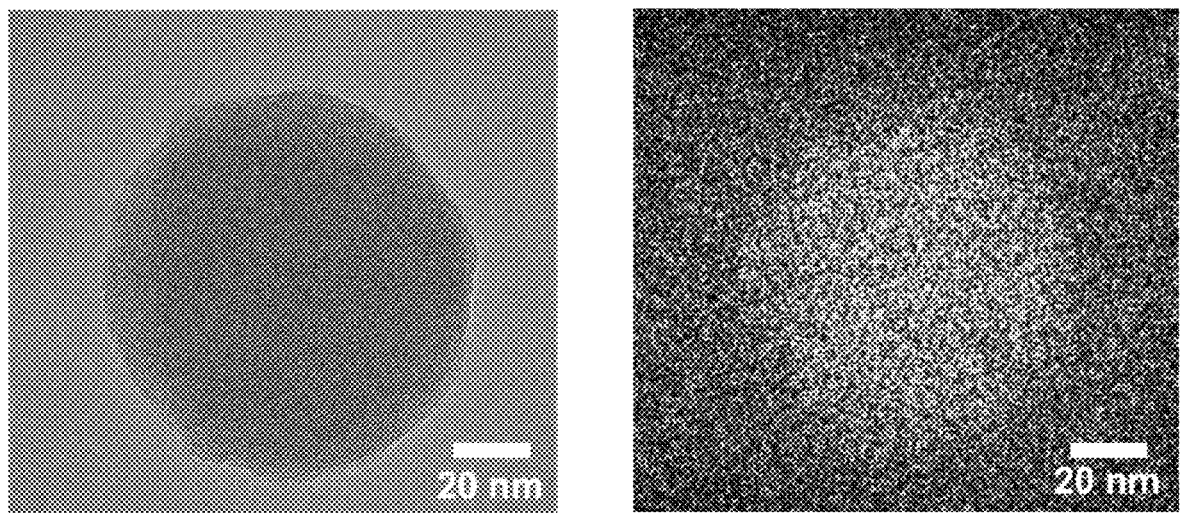
FIGS. 8a, 8b and 8c show hydrophilic evaluation results of the PPy nano-particle porous membrane, where
Figure 8B:
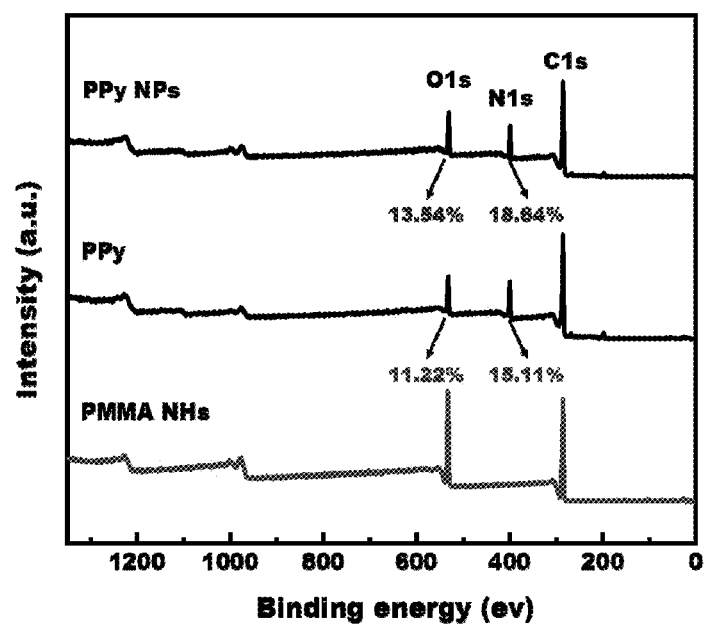
Figure 8C:
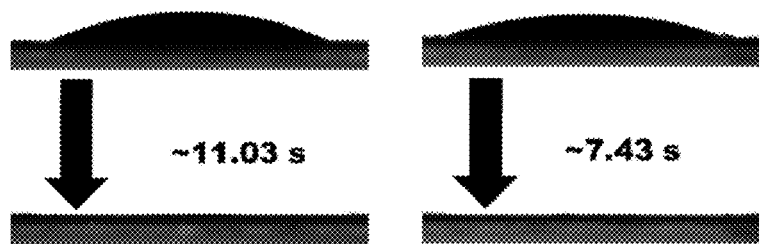

The FIG. 8a is obtained using scanning transmission electron microscope (STEM) (model Talos F200X) and its energy dispersion spectroscopy test; FIG. 8b is obtained using X-ray electron spectroscopy test (model: Thermo Fisher, 250Xi), and results of FIG. 8c are obtained using a contact angle tester (model: DataPhysics, OCA 50). The hydrophilicity of the membranes in Embodiment 1 and Comparative embodiment 1 are illustrated in FIG. 8a-FIG. 8c, with FIG. 8a indicating that there are a lot of oxygen-containing hydrophilic groups exist in the PPy nano-particles, X-ray photoelectron spectroscopy (XPS) broad spectrum characterization results in FIG. 8b showing that PPy nano-particles have the highest number of oxygen-containing groups (13.54%) compared with Comparative embodiment 2 and PMMA nano hydrogel, and it can be seen from the results of contact angle characterization as shown in FIG. 8c that the contact angle of the PPy nano-particle membrane in Embodiment 1 is smaller (42.7° and decreases to 0° in 7.43 seconds (s) compared to the PPy nano-particle membrane in Comparative embodiment 1, where the contact angle decreases from 54.1° to 0° in 11.03 s. This demonstrates that the rough porous structure of the membrane significantly enhances the hydrophilicity of the membrane and promotes fluid flow within the membrane. In particular, the enhanced hydrophilicity can generate a high Laplace force in the membrane to drive the rapid fluid transfer, which results in a continuous water supply during evaporation.

Figure 9A:
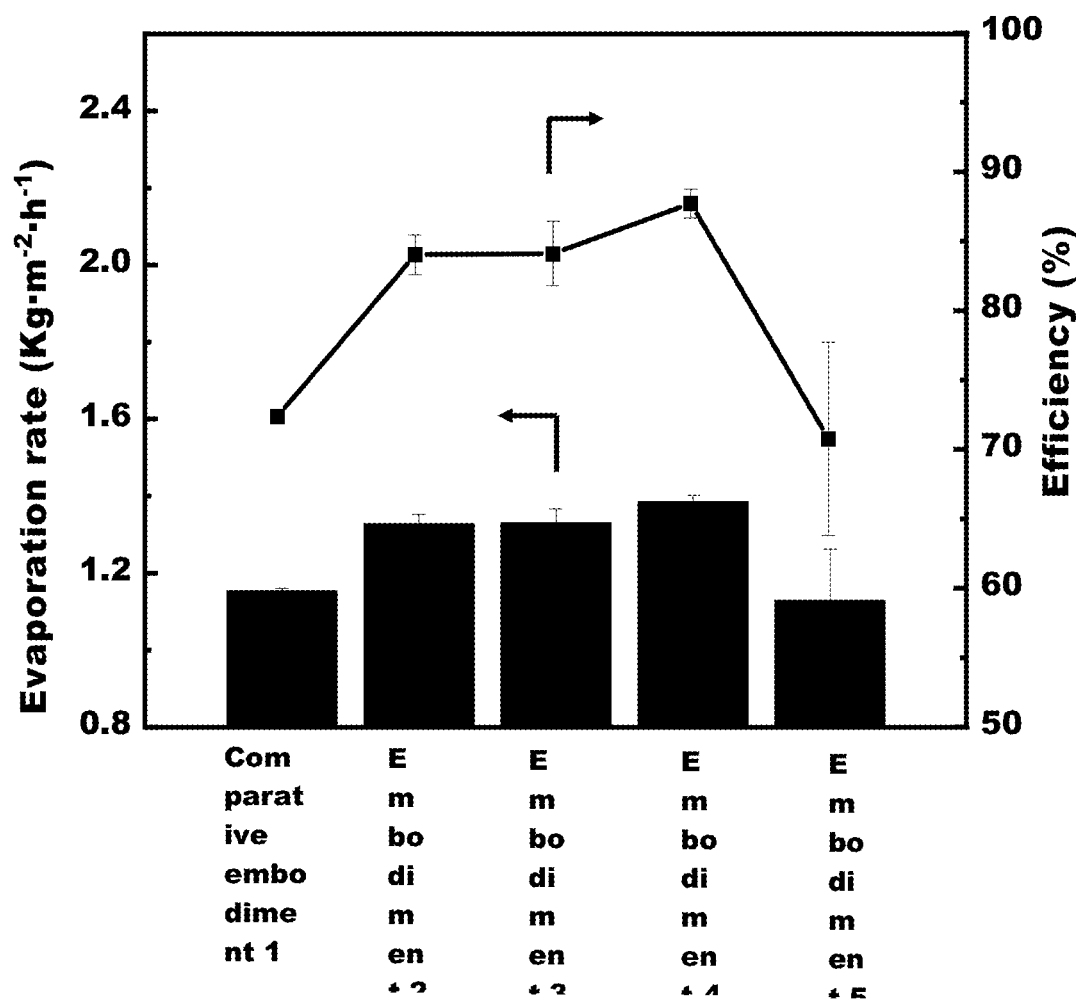
FIGS. 9a, 9b and 9c show performance results of all the membranes of the present disclosure, where
Figure 9B:
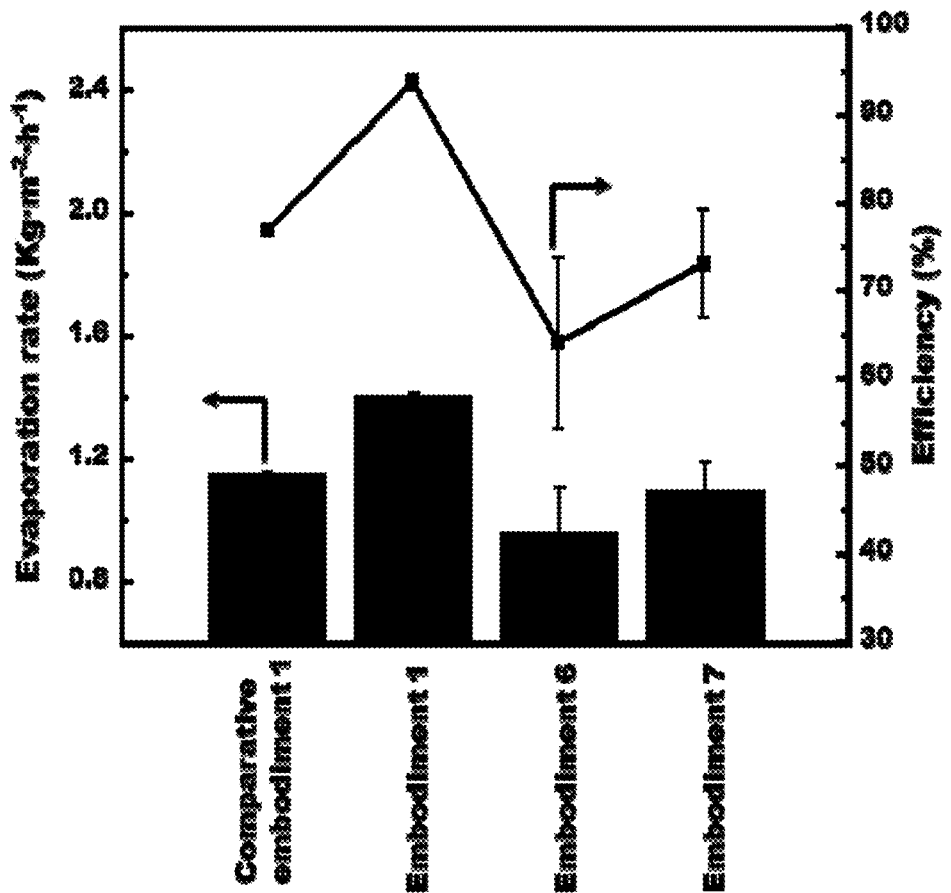
Figure 9C:
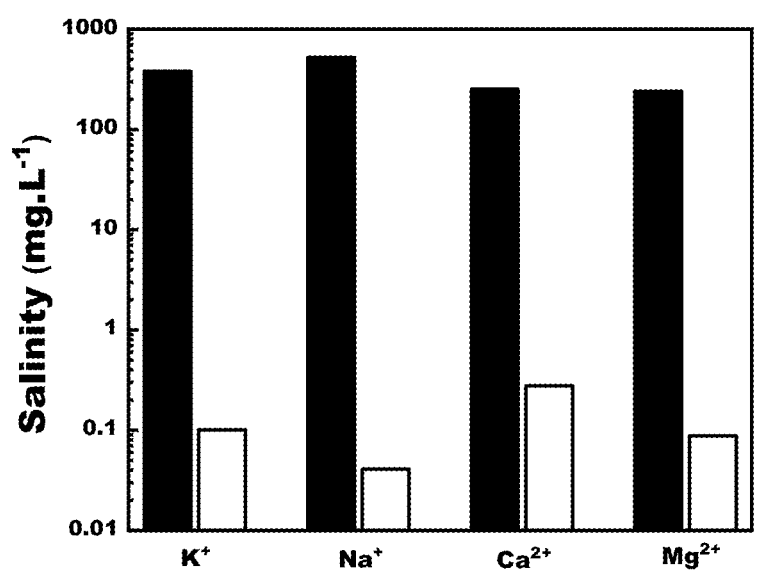

FIG. 9a-FIG. 9c show the results of the solar simulator (model 7ILX500P) tested under one solar intensity. The photothermal conversion efficiencies and photothermal evaporation of Comparative embodiment 1 and Embodiments 1-7 are shown in FIG. 9a-FIG. 9c, from where it can be seen that the changes of the photothermal conversion efficiencies of the membranes and their absorbance rates are approximately the same. Moreover, it is found that the Embodiments 5 and 6 have the lowest photothermal performance, which should be related to the fact that the membrane structure is too loose, resulting in a large amount of water entering the membrane and making the heat transfer loss increase substantially, in addition to the significant decrease of the light absorption rate of the membrane.

The results show that the photothermal conversion efficiency of Embodiment 1 is 93.79±0.89% and the photothermal evaporation is 1.41±0.01 kilograms per hour per square meter ($kg \cdot m^{-2} \cdot h^{-1}$); the photothermal conversion efficiency of Comparative embodiment 1 is 76.94±0.44% and the photothermal evaporation is 1.15±0.01 $kg \cdot m^{-2} \cdot h^{-1}$. Embodiment 1 has a 21.9% increase in photothermal conversion efficiency compared to Comparative embodiment 1, and a 22.6% increase in photothermal evaporation. FIG. 9c shows the results of desalination of seawater in Embodiment 1, from which it can be seen that the salt content of the seawater has decreased by more than 2 orders of magnitude after photothermal evaporation.

The above-mentioned embodiments are preferred embodiments of the present disclosure, but the embodiments of the present disclosure are not limited by the above-mentioned embodiments. Any other changes, modifications, substitutions, combinations and simplifications made without departing from the spirit and principle of the present disclosure should be equivalent replacement methods, and included in the scope of protection of the present disclosure.

What is claimed is:

1. A method for preparing a high-efficiency photothermal evaporative nano-particle porous membrane, comprising steps as follows:
   (1), dissolving polymer A in solvent B to obtain solution A; and dripping solution A into solvent C to obtain a polymer A nano hydrogel dispersion;
   (2), evenly mixing polymer A nano hydrogel dispersion and nano particle dispersion of photothermal conversion material D to obtain a co-blended dispersion; performing suction-filtering to the co-blended dispersion on a surface of a solvent-resistant membrane E to form an A-D co-blended membrane; and
   (3), performing suction-filtering to a solvent F using the A-D co-blended membrane, and drying to obtain a high-efficiency photothermal evaporative nano-particle porous membrane;
   wherein the polymer A in the step (1) comprises at least one selected from a group of polymethyl methacrylate (PMMA), polyether sulphone and polyvinylidenefluoride;
   the solvent B in the step (1) is at least one selected from a group of tetrahydrofuran, dimethylformamide, dimethyl sulfoxide, dichloromethane and acetone;
   the solvent C in the step (1) is at least one of water and ethanol;
   the photothermal conversion material D in the step (2) is at least one of polypyrrole (PPy), polyaniline and poly dopamine;
   the solvent-resistant membrane E is a nylon microfiltration membrane, a polyvinylidene fluoride microfiltration membrane or a polytetrafluoroethylene microfiltration membrane;

the solvent F in the step (3) is at least one selected from a group of tetrahydrofuran, dimethylformamide, dimethyl sulfoxide, dichloromethane and acetone; and the polymer A nano hydrogel dispersion and the nano particle dispersion of photothermal conversion material D in the step (2) are used in an amount proportioned according to a mass ratio of the polymer A:the photothermal conversion material D=16–120:3.

2. The method for preparing a high-efficiency photothermal evaporative nano-particle porous membrane according to claim 1, wherein the solvent B in the step (1) is used in an amount of the polymer A:the solvent B=0.1–1 g:100 mL.

3. The method for preparing a high-efficiency photothermal evaporative nano-particle porous membrane according to claim 1, wherein:
the dripping in the step (1) is carried out in a dripping speed of 4-6 mL/min;
the mixing in the step (2) is ultrasonic co-blending; and
the drying in the step (3) is carried out at 55-65° C.

4. The method for preparing a high-efficiency photothermal evaporative nano-particle porous membrane according to claim 1, wherein in the step (1), dissolving the polymer A in the solvent B is carried out under heating condition so as to dissolve the polymer A in solvent B.

5. The method for preparing a high-efficiency photothermal evaporative nano-particle porous membrane according to claim 1, wherein the nano particle dispersion of photothermal conversion material D in the step (2) is prepared as follows:
dissolving polyvinylpyrrolidone and ferric chloride in water to obtain homogeneous solution;
adding monomer for reaction, washing, and dispersing in water by ultrasonic to obtain the nano particle dispersion of the photothermal conversion material D.

6. The method for preparing a high-efficiency photothermal evaporative nano-particle porous membrane according to claim 5, wherein:
the ferric chloride is anhydrous ferric chloride;
the ferric chloride is used in a mass amount equal to more than 6 times a mass of polyvinylpyrrolidone;
the monomer is pyrrole;
the monomer is used in an amount of 1/5-1/15 of a mass of anhydrous ferric chloride;
the reaction is carried out under stirring at 120-180 rpm for 15-25 h;
the washing refers to solid-liquid separation by centrifugation, comprising washing solid with water; and
the ultrasonic conditions are an ultrasonic power of 120-180 W and an ultrasonic duration of 15-30 min.

7. A high-efficiency photothermal evaporative nano-particle porous membrane prepared with the method according to claim 1.

8. The high-efficiency photothermal evaporative nano-particle porous membrane according to claim 7, wherein the high-efficiency photothermal evaporative nano-particle porous membrane achieves a photothermal conversion efficiency of 88.56-93.79%, with a photothermal evaporation capacity of 1.33-1.41 kg·m$^{-2}$·h$^{-1}$.

9. An application of the high-efficiency photothermal evaporative nano-particle porous membrane, comprising:
providing the high-efficiency photothermal evaporative nano-particle porous membrane according to claim 7; and
using the high-efficiency photothermal evaporative nano-particle porous membrane to desalinate seawater.

* * * * *